MAGNETO-SONIC CORRELATOR APPARATUS

Filed Oct. 24, 1967 3 Sheets-Sheet 1

INVENTORS.
EDMUND U. COHLER and
HARVEY RUBINSTEIN

BY Peter Xiarhos

AGENT.

INVENTORS.
EDMUND U. COHLER and
HARVEY RUBINSTEIN

BY Peter Xiarhos

AGENT.

Feb. 10, 1970 E. U. COHLER ET AL 3,495,227

MAGNETO-SONIC CORRELATOR APPARATUS

Filed Oct. 24, 1967 3 Sheets-Sheet 3

INVENTORS.
EDMUND U. COHLER and
HARVEY RUBINSTEIN

BY Peter Xiarhos

AGENT.

United States Patent Office 3,495,227

Patented Feb. 10, 1970

3,495,227

MAGNETO-SONIC CORRELATOR APPARATUS

Edmund U. Cohler, Lexington, and Harvey Rubinstein, Lynnfield, Mass., assignors to Sylvania Electric Products, Inc., a corporation of Delaware Filed Oct. 24, 1967, Ser. No. 677,548
Int. Cl. G11b 5/00; G06f 7/02
U.S. Cl. 340—174 10 Claims

ABSTRACT OF THE DISCLOSURE

Magneto-sonic correlator for correlating unknown information with stored reference information. The reference information is recorded in rows of magnetostrictive cells on a stress-wave conducting substrate by the coincidence of a single stress pulse propagated along the substrate and an electromagnetic field applied to the cell of each row. Alternatively, the reference information may be recorded by electromagnetic fields alone. Correlation of the unknown information with the recorded information is achieved by a plurality of propagating stress pulses representative of the unknown information which probe the cells of each row causing signals representative of the degree of correlation between the unknown information and the information recorded in each row to be induced in each of a plurality of conductors associated with the rows of cells.

BACKGROUND OF THE INVENTION

The present invention relates to thin film magnetic data processing apparatus, and more particularly, to a high-speed memory correlator for correlating arbitrary or unknown data patterns with known stored patterns.

In many communication systems, for example, radar systems, it is often necessary or desirable to correlate a received analog or digital signal with a plurality or library of stored reference patterns in order to determine particular characteristics of the received signal or adulterations therein. Similarly, in various computer or general data processing systems, it is often desirable to correlate a digital binary signal with binary information stored in a memory section thereof and to use the results of the correlation elsewhere in the data processing system.

Various prior art systems and apparatus are known for correlating an unknown analog or binary pattern with a library of reference patterns to determine the best match between the unknown pattern and the individual patterns comprising the library of known patterns. For example, correlation of binary data patterns or words have been performed by multi-aperture core memory systems utilizing multi-aperture magnetic cores of the square hysteresis loop, nondestructive read-out type. However, because of such factors as high cost, low storage density, complicated winding schemes and attendant production difficulties, a large resulting assembly, and high-power driver requirements, such multi-aperture core correlators have been undesirable or impractical for use in many correlation applications.

Additionally, correlation of binary information by digital computers according to arithmetic processes, while practical for low-speed correlation of binary information, has generally been unsatisfactory for high-speed correlation of information. Moreover, such known prior art permanent or semi-permanent storage devices as apertured cards and masks, because of the relatively unalterable storage content of such cards and masks, are too inflexible for correlation purposes where stored information must be capable of rapid and frequent modification or updating.

SUMMARY OF THE INVENTION

Briefly, in accordance with the magneto-sonic correlator apparatus of the present invention, a magneto-sonic means is provided which includes a stress-wave conducting means adapted to conduct a stress wave, a plurality of magnetostrictive cells arranged on the stress-wave conducting means in a predetermined format, conductor means associated with the cells, and a stress-wave generating means adapted to propagate a stress wave along the stress-wave conducting means. Information with which unknown input information is to be correlated is recorded in the magnetostrictive cells by a recording means which is adapted to establish either a first state of magnetization or a second state of magnetization in each of the cells corresponding to a first type or a second type of information.

To correlate unknown input information with the recorded information, signals representative of the unknown input information are provided to the stress-wave generating means to cause the stress-wave generating means to propagate a stress-wave representative of the unknown input information along the stress-wave conducting means. The stress wave stresses each of the cells whereby the remanent flux of each of the cells is increased or decreased depending on the state of magnetization of each cell and the input information represented by the stress wave. As a result of the changes in remanent flux, signals of a first type corresponding to increases in the remanent flux or a second type corresponding to decreases in the remanent flux are induced in the conductor means associated with the cells. A threshold circuit means establishing a predetermined threshold condition which represents a desired degree of correlation receives the induced signals and provides an output signal when the combination of the induced signals of the first type or the second type in the conductor means exceeds the predetermined threshold condition.

MAGNETO-SONIC DEVICE (FIG. 1)

Figure 1:
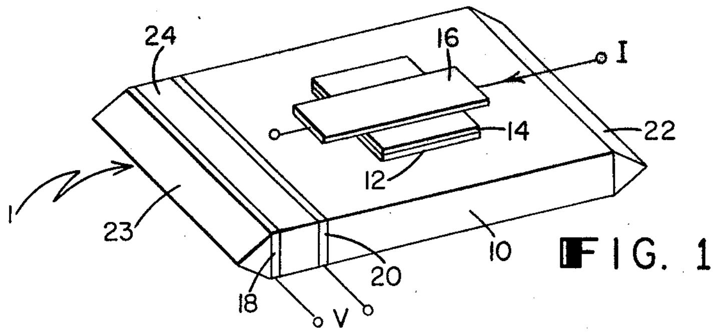
FIG. 1 is an enlarged schematic representation of a first magneto-sonic device useful in explaining the operation of a magneto-sonic correlator of a first embodiment of the invention.

Referring to FIG. 1, there is shown at 1 in a greatly enlarged form a basic magneto-sonic device, the principle of operation of which is employed in the correlator of the first embodiment of the invention. The magneto-sonic device 1 is of a type described in detail in an application for patent by the applicants of the present invention for "Magneto-Sonic Thin Film Memory," Ser. No. 495,934 filed Oct. 14, 1965, now Patent No. 3,465,305 and assigned to the assignee of the present invention. As shown in FIG. 1, the magneto-sonic device 1 includes a sound-conducting substrate 10 on which is deposited in succession, a thin planar magnetostrictive film or cell 12 exhibiting the characteristic of a uniaxial anisotropy, an insulating layer 14, a conducting strip 16. A first electrode 20 is affixed to one end of the substrate 10. An acoustic transducer 24 is secured to the electrode 20 and to a second electrode 18. A potential V is applied via the electrodes 18 and 20 to the acoustic transducer 24 to cause the acoustic transducer 24 to generate a stress pulse, that is, a sonic pulse, which propagates along the substrate 10 in a direction away from the electrode 20. A first acoustic absorber 22 is affixed to the far end of the substrate 10 to absorb pulse energy reaching the far end of the substrate 10 and to thus prevent reflections therefrom. A second acoustic absorber 23 is affixed to the electrode 18 to absorb any pulse energy which may travel in the opposite direction.

The theory of the operation of the basic magneto-sonic device 1 depicted in FIG. 1 is as follows. It has been discovered that a thin magnetostrictive film which is stressed exhibits different magnetic characteristics than an unstressed film, namely, a reduced switching threshold and a change in remanent flux. By suitably stressing a magnetic film, a properly-oriented magnetic field, which alone would be of insufficient strength to change the initial state of magnetization of an unstressed film, can switch the initial state of magnetization of the stressed film due to the reduced switching threshold. Information can therefore be written into the magnetic film by simultaneously applying a stress pulse and a suitably-oriented magnetic field to the magnetic film. Once information is recorded in the magnetic film, such information can be read out in a nondestructive manner by a scanning or probing stress pulse alone. More specifically, the scanning stress pulse, which alone is unable to alter the state of magnetization of the magnetic film, stresses the film whereby the easy axis of the film is rotated and a reversible change in the remanent flux of the magnetic film is effected. The change in the remanent flux of the magnetic film is reversible inasmuch as the magnetization of the film returns to its initial value once the stress pulse propagates away from the film. The changes in the remanent flux are detected to indicate the information stored in the film.

In accordance with the above theoretical considerations, to record information in a particular location in the thin magnetic film 12 of the magneto-sonic device 1 of FIG. 1, a voltage V is applied to the electrodes 18 and 20 to excite the acoustic transducer 24 whereby a plane longitudinal or shear stress pulse is launched into and along the length of the stress-wave conducting substrate 10. As the stress pulse traverses the various overlying regions of the magnetostrictive film 12, these regions are temporarily stressed and thus have a reduction in switching threshold. When the stress pulse reaches the praticular location in the magnetic film 12 where it is desired to record information, a current pulse from a suitable source is transmitted through the conducting strip 16 producing a properly-oriented electromagnetic field in the film which, because of the reduced switching threshold, switches the initial magnetic state of the film at the particular location where the information is to be stored. The stress pulse propagates relatively slowly with respect to the electromagnetic field which propagates at essentially the speed of light; thus, the point of coincidence where data is to be recorded is determined essentially by the stress pulse, the electromagnetic field propagating fast enough to intercept the stress pulse at the selected storage location. When the stress pulse propagates away from each point in the film 12, the film 12 at each point returns to its initial unstressed condition.

To read out information stored in the thin magnetic film 12, only a probing stress pulse is required. The effect of the stress pulse is to temporarily stress the magnetic film 12 as the film is scanned whereby the easy axis of the film is rotated and the remanent flux of the film is changed. The change in the remanent flux due to the rotation of the easy axis of magnetization of the film is detected by the conducting strip 16 to provide a representation of the information stored in the film. More particularly, the component of the change in the remanent flux which is normal to the direction of the propagation of the stress pulse is detected. It has been discovered that the output voltage induced in the conducting strip 16 is optimized when the easy axis of magnetization of the magnetic film 12 is chosen to be at an angle to the direction of propagation of the stress pulse other than 0 or 90°. For eaxmple, an angle of 30° has been found to be highly satisfactory. For additional details relating to the magneto-sonic device 1, reference may be made to the abovecited patent.

MAGNETO-SONIC CORRELATOR—FIG. 2

Figure 2:
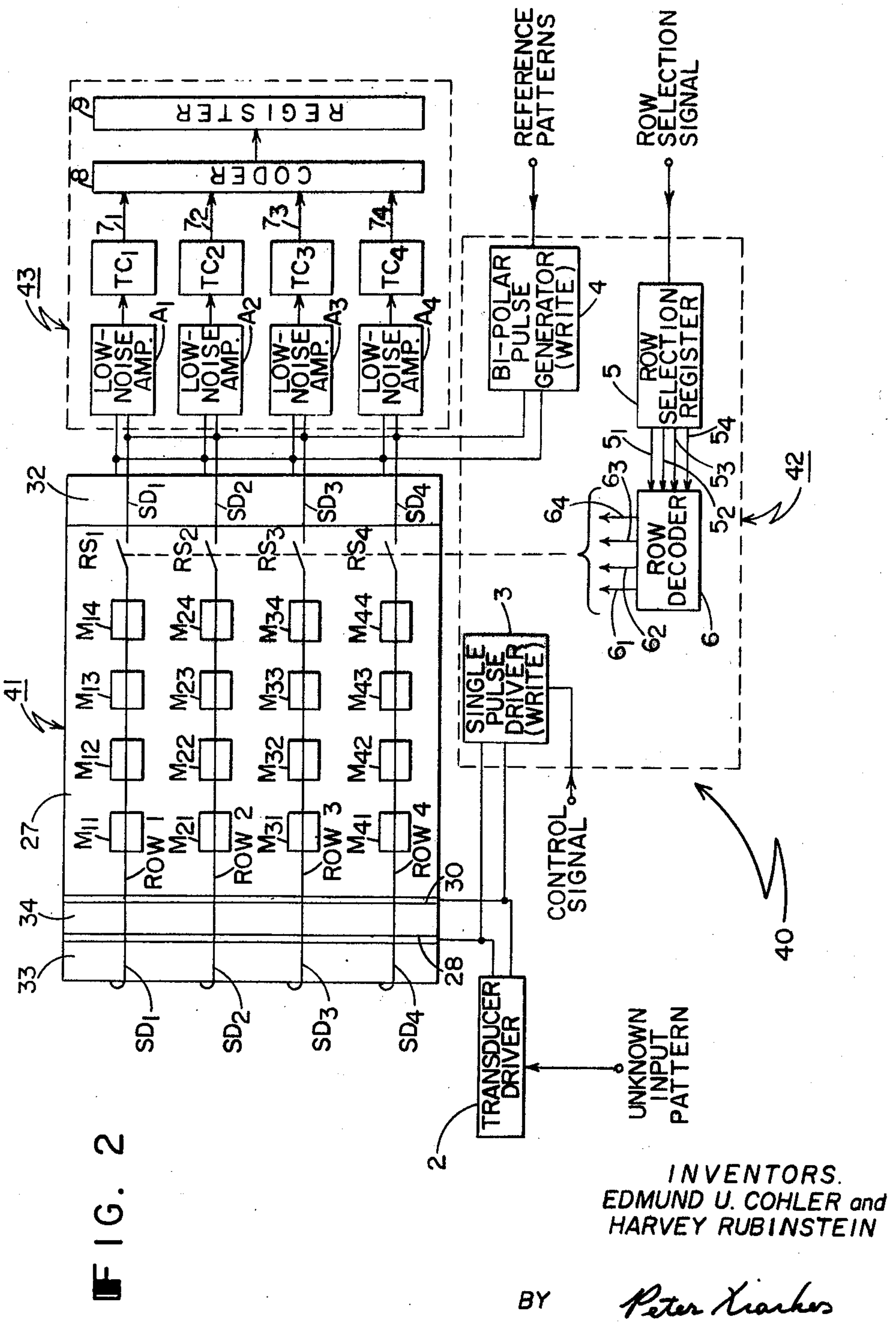
FIG. 2 is a detailed schematic block diagram of the magneto-sonic correlator of the first embodiment of the invention.

FIG. 2 illustrates in a schematic block diagram form a magneto-sonic correlator 40 employing the principle of operation of the magneto-sonic device 1 of FIG. 1. As shown in FIG. 2, the magneto-sonic correlator 40 generally comprises a magneto-sonic matrix 41, a transducer driver 2, a recording arrangement 42, and an output arrangement 43. The magneto-sonic matrix 41 further comprises: a stress-wave conducting substrate 27; a first electrode 30 separated from a second electrode 28 by an acoustic transducer 34; a first sound absorber 32 affixed to the far end of the stress-wave conducting substrate 27; a second sound absorber 33 secured to the second electrode 28; a plurality of discrete appropriately-spaced thin magnetostrictive memory films or cells M arranged in a plurality of rows; a plurality of sense-drive conductors $SD_1 \ldots SD_4$ associated with each row of memory cells M and insulated therefrom; and a plurality of normally-open row switches $RS_1 \ldots RS_4$ disposed in the sense-drive conductors $SD_1 \ldots SD_4$. Although only sixteen memory cells M are shown in FIG. 2, such showing is exemplary only, it being understood that in a given application a lesser or a greater number of memory cells may be employed.

The recording arrangement 42 comprises a single-pulse driver 3 connected to the electrodes 28 and 30 of the magneto-sonic matrix 41, a bi-polar pulse generator 4 connected in parallel to each of the sense-drive conductors $SD_1 \ldots SD_4$, a row selection register 5, and a row decoder 6 coupled to the row selection register 5 by means of a plurality of register output lines $5_1 \ldots 5_4$. The output lines of the decoder 6, indicated at $6_1 \ldots 6_4$, are used to selectively operate the row switches $RS_1 \ldots RS_4$ as indicated by the vertical dotted line. The row switches $RS_1 \ldots RS_4$, shown as mechanical switches in FIG. 2, may be, and generally are, electronic gates. The output arrangement 43 of FIG. 2 comprises a plurality of low-noise amplifiers $A_1 \ldots A_4$ connected to the sense-drive conductors $SD_1 \ldots SD_4$, a plurality of threshold circuits $TC_1 \ldots TC_4$ connected to the low-noise amplifiers $A_1 \ldots A_4$, a coder 8 coupled to the threshold circuits $TC_1 \ldots TC_4$ via a plurality of threshold circuit output lines $7_1 \ldots 7_4$, and a register 9 connected to the coder 8.

REFERENCE PATTERN STORAGE—FIG. 2

The manner in which a reference pattern is stored in a row of the magneto-sonic correlator 40 of FIG. 2 will now be described in detail. To record (write) a reference pattern into a selected row of the magneto-sonic matrix 41 of FIG. 2, the row switch RS associated with the selected row is closed, the acoustic transducer 34 is excited by the single-pulse driver 3 to generate a stress pulse in the stress-wave conducting substrate 27, and signals representative of a reference pattern are applied by the bipolar pulse generator 4 to the sense-drive conductor SD associated with the selected row in synchronism with the arrival of the stress pulse at each of the cells. For example, assume that it is desired to store a four-bit pattern in the top row (ROW 1) of the magneto-sonic matrix 41. A binary row selection address signal representative of the ROW 1 is loaded into the row selection register 5 in serial or in parallel, and then gated out over the register output lines $5_1 \ldots 5_4$ into the row decoder 6. The ROW 1 address signal is decoded by the row decoder 6 and the output line $6_1$ associated with the row switch $RS_1$ is energized, thereby effecting the closing of the row switch $RS_1$. The single-pulse driver 3 is then operated by a suitable control signal from a timing and control unit of conventional construction (not shown) to apply a voltage at the terminals 28 and 30 whereby the acoustic transducer 34 is operated to generate a stress pulse.

The stress pulse generated by the acoustic transducer 34 propagates along the stress-wave conducting substrate 27. The binary reference pattern from the bi-polar pulse generator 4, comprising individual pulses of either a positive polarity (representing binary "ones") or a negative polarity (representing binary "zeros"), is applied to the sense-drive conductor $SD_1$ to establish appropriate electromagnetic fields of either a first direction or a second direction at each of the memory cells $M_{11}$, $M_{12}$, $M_{13}$, and $M_{14}$ in synchronism with the arrival of the stress pulse at each of the memory cells $M_{11}$, $M_{12}$, $M_{13}$, and $M_{14}$. The direction of the electromagnetic field applied to each cell as the stress pulse traverses the cell is determined by the polarity of the pulse of the pattern to be stored in the cell, that is, whether the pulse represents a binary "one" (positive polarity) or a binary "zero" (negative polarity). In the manner described previously, by suitably stressing each of the memory cells M, the switching threshold of each cell is reduced and the electromagnetic fields switch the magnetization states of the stressed memory cells M. Thus, in the correlator 40 of FIG. 2, where there is a coincidence of the stress pulse and a properly-oriented electromagnetic field in a first direction or a second direction corresponding to the polarity of the bit of information to be recorded at each of the memory cells $M_{11}$, $M_{12}$, $M_{13}$, and $M_{14}$, a bit of information is stored in each of the cells.

In the same manner as described above, reference patterns may be stored in ROWS 2, 3, and 4. The sequence in which the reference patterns are stored in the rows of the magneto-sonic matrix 41 may be consecutively, fixed, or variable, as desired. In the event correlation is to be performed between analog signals rather than binary signals as described hereinabove, the reference analog patterns are first quantized into two levels, where one level corresponds to the "one" state and the other level to the "zero" state as described hereinabove, and stored in the rows of the magneto-sonic matrix 41 in the above-described manner. The unknown analog pattern which is to be correlated with the stored reference analog patterns is also quantized into two levels prior to actual correlation.

CORRELATION—FIG. 2

To correlate an unknown input pattern, whether a binary bi-polar pattern or quantized analog pattern, with the patterns stored in the separate rows of the magneto-sonic matrix 41, the row switches $RS_1 \ldots RS_4$ are closed in sequence by the row decoder 6 and the unknown bi-polar pattern is then applied to the transducer driver 2. If desired, the row switches $RS_1 \ldots RS_4$ may be closed simultaneously by additional external apparatus (not shown). The transducer driver 2 is operated by the unknown bi-polar pattern to provide an output signal to the acoustic transducer 34 which corresponds to the unknown bi-polar input pattern. The acoustic transducer 34 launches a bi-polar stress wave which is a replica of the unknown input pattern into and along the stress-wave conducting substrate 27. The acoustic transducer 34 is operated such that adjacent information-representing stress pulses of the stress wave are spaced apart by a distance equal to the spacing between adjacent cells.

As each of the plurality of sonic pulses comprising the bi-polar stress wave traverses each memory cell M of each row, a rotation of the magnetization of each cell takes place whereby a voltage signal having either a positive polarity or a negative polarity corresponding to increases or decreases in the magnetic flux of the cells is induced by each cell in the sense-drive conductor SD associated therewith. For example, if a positive sonic pulse traverses a memory call storing a binary "one," an increase in the remanent flux occurs and a positive voltage signal is induced in the associated sense-drive conductor. If a negative sonic pulse traverses a memory cell storing a binary "zero," again an increase in the remanent flux occurs and again a positive voltage signal is induced in the associated sense-drive conductor. If a positive sonic pulse traverses a memory cell storing a binary "zero," or a negative sonic pulse traverses a memory cell storing a binary "one," a decrease in the remanent flux occurs and a negative voltage signal is induced in the associated sense-drive conductor.

As the bi-polar sonic pulses of the stress wave are generated successively into the stress-wave conducting substrate 27 by the acoustic transducer 34 and propagated along the stress-wave conducting substrate 27, several correlations take place between the information represented by each sonic pulse and the information stored in each cell. For example, when the first stress pulse of the stress wave is launched into the stress-wave conducting substrate 27, a comparison of the information represented by the first stress pulse and the information stored in each of the cells $M_{11}$, $M_{21}$, $M_{31}$, and $M_{41}$ takes place, and signals of either a first polarity or a second polarity are induced in the associated sense-drive conductors $SD_1 \ldots SD_4$. As mentioned previously, the polarity of the induced signals depends on the polarity of the stress pulse and the nature of the information stored in the cells.

When the second stress pulse is launched into the stress-wave conducting substrate 27, the information represented by the first stress pulse is compared with the information stored in the cells $M_{12}$, $M_{22}$, $M_{32}$, and $M_{42}$, and the information represented by the second stress pulse is compared with the information stored in the cells $M_{11}$, $M_{21}$, $M_{31}$, and $M_{41}$. In a similar manner as described herein, when the third and fourth sonic pulses are propagated along the stress-wave conducting substrate 27, comparisons are made between the information represented by each of the four stress pulses and the information stored in each of the corresponding cells of each row.

After each arrival of a sonic pulse of the stress wave at a cell M, the positive and negative induced voltage signals are summed by the sense-drive conductors $SD_1 \ldots SD_4$. A positive voltage signal has the effect of cancelling a negative voltage signal. From the above it is evident that where the pulses of the sonic stress wave representing the unknown pattern traverse a row of memory cells storing the identical binary pattern, the maximum number of positive voltage signals, representative of a perfect match, are induced in the sense-drive conductor associated with the row. Where the information is not identical, less than the maximum number of positive voltage signals are induced in the sense-drive conductor associated with the row, and the summed signal is less than the maximum possible value.

After the voltage signals appearing on each of the sense-drive conductors $SD_1 \ldots SD_4$ are summed, the summed voltage signals are applied by the sense-drive conductors $SD_1 \ldots SD_4$ to the low-noise amplifiers $A_1 \ldots A_4$, and amplified thereby. The particular sense-drive conductor SD carrying the greatest voltage is determined by the threshold circuits $TC_1 \ldots TC_4$. Each of the threshold circuits $TC_1 \ldots TC_4$ is adapted to have a threshold level representative of the optimum or desired degree of correlation of an input pattern and a stored reference pattern. When the threshold level is attained, an output signal is provided to the coder 8 over one of the output lines $7_1 \ldots 7_4$. The coder 8 codes the signal received over one of the lines $7_1 \ldots 7_4$ into a sufficient number of bits identifying the row of the matrix 41 providing the optimum or desired match. For the correlation of FIG. 2, two bits would be sufficient to provide a particular row address ($2^k$=number of rows of cells, where $k=2$. The coded address from the coder 8 is then applied to the register 9 or, alternatively, fed to other utilization devices such as display units or appropriate sections of a computer.

MAGNETO-SONIC CORRELATOR—FIG. 4

Figure 3:
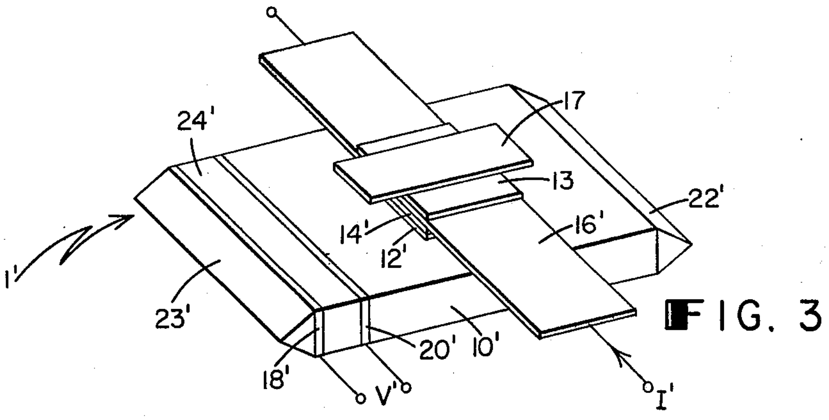
FIG. 3 is an enlarged schematic representation of a second magneto-sonic device useful in explaining the operation of a magneto-sonic correlator of a second embodiment of the invention.
Figure 4:
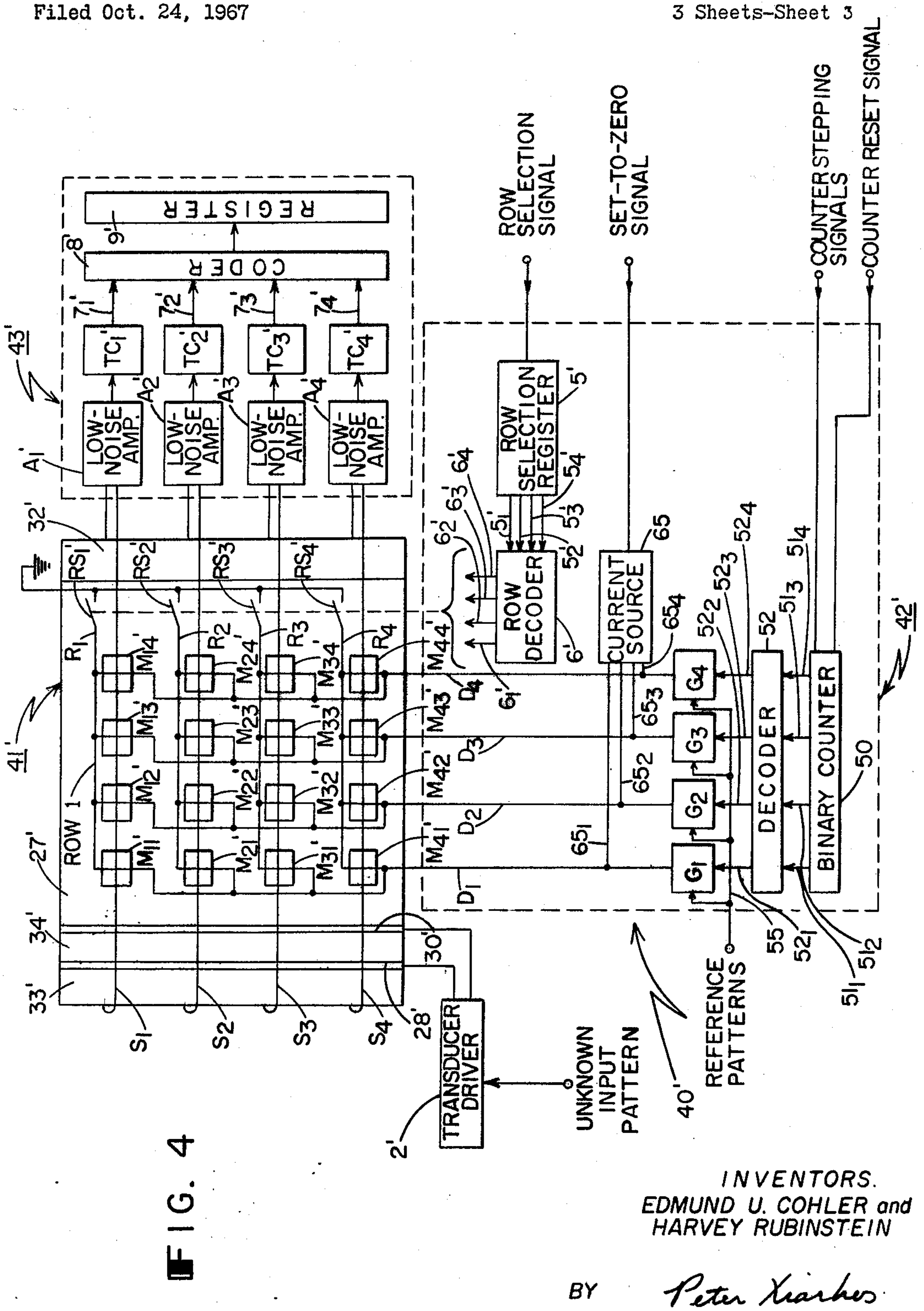
FIG. 4 is a detailed schematic block diagram of the magneto-sonic correlator of the second embodiment of the invention.

FIG. 4 illustrates in a schematic block diagram form, a magneto-sonic correlator 40′ embodying the principle of operation of a modified version of the magneto-sonic device 1 shown in FIG. 1. The modified version of the magneto-sonic device 1 is illustrated in an enlarged form at 1′ in FIG. 3. As may be noted from FIG. 3, the modified magneto-sonic device 1′ includes all of the components of the magneto-sonic device 1 of FIG. 1 with the exception that the single conducting strip 16 in FIG. 1 has been replaced in FIG. 3 by separate conducting strips 16′ and 17 separated by an additional insulating layer 13. The strip 16′, which is transverse to the conducting strip 17, serves as a drive conductor only; the conducting strip 17 serves as a sense conductor only.

Referring to FIG. 4, the magneto-sonic correlator 40′ of the present invention comprises generally the same basic combination of organizational elements as the correlator of FIG. 2, namely, a magneto-sonic matrix 41′, a transducer driver 2′, a recording arrangement 42′, and an output arrangement 43′. The magneto-sonic matrix 41′ comprises: a sound-conducting substrate 27′; an acoustic transducer 34′; a pair of electrodes 28′ and 30′; a pair of sound absorbers 32′ and 33′; a plurality of discrete, thin magnetostrictive cells M′ arranged in a row-and-column format; a plurality of drive conductors $D_1 \ldots D_4$ associated with each column of memory cells M′; a plurality of sense conductors $S_1 \ldots S_4$ associated with each row of memory cells M′ and insulated from the drive conductors $D_1 \ldots D_4$; and a plurality of row selection lines $R_1 \ldots R_4$ connected to ground potential through a plurality of row switches $RE_1' \ldots RS_4'$.

The recording arrangement 42′ comprises: a binary counter 50; a decoder 52 coupled to the binary counter 50 via a plurality of counter output lines $51_1 \ldots 51_4$; a plurality of gates $G_1 \ldots G_4$ coupled to a source of reference signals by means of a line 55 and to the decoder 52 by means of a plurality of decoder output lines $52_1 \ldots 52_4$; a current source 65 having a plurality of output lines $65_1 \ldots 65_4$; a row selection register 5′; and a row decoder 6′ coupled to the row selection register 5′ via a plurality of register output lines $5_1' \ldots 5_4'$. A plurality of output lines $6_1' \ldots 6_4'$ are used to control the individual row selection switches $RS_1' \ldots RS_4'$ as indicated by the vertical dotted line.

The output means 43′ of FIG. 4 comprises the same elements as the output means 43 of FIG. 2, namely, a plurality of low-noise amplifiers $A_1' \ldots A_4'$ coupled to the associated sense conductors $S_1 \ldots S_4$, a plurality of threshold circuits $TC_1' \ldots TC_4'$ connected to the low noise amplifiers $A_1' \ldots A_4'$, a coder 8′ connected to the threshold circuits $TC_1' \ldots TC_4'$ via a plurality of output lines $7_1' \ldots 7_4'$, and a register 9′ connected to the coder 8′.

REFERENCE PATTERN STORAGE—FIG. 4

The manner of storing reference patterns in the individual rows of the magneto-sonic matrix 41′ differs from that previously described in connection with the correlator 40 of FIG. 2 in that no stress pulse is required. Rather, current signals on the drive conductors $D_1 \ldots D_4$ are used to record information in the rows of the matrix 41′. The manner in which a reference pattern is stored in a row of the matrix 41′ will now be described. As before, it will be assumed that it is desired to store a reference pattern in the top row (ROW 1) of the matrix 41′.

Initially, all of the ROW 1 memory cells M′ not previously "erased," that is, set to "zero," are placed in erased condition. The erasing function is accomplished by closing the row switch $RS_1'$ and by operating the current source 65 which, upon receiving a SET-TO-ZERO signal from a timing and control unit (not shown), provides signals of a negative polarity and of sufficient magnitude on each of the current source output lines $65_1 \ldots 65_4$ to the corresponding drive conductors $D_1 \ldots D_4$. An electromagnetic field having an orientation representative of a binary "zero" is produced in the region of each of the ROW 1 memory cells $M_{11}'$, $M_{12}'$, $M_{13}'$, and $M_{14}'$, and each of the memory cells $M_{11}' \ldots M_{14}'$ assumes a state of magnetization representative of a binary "zero." When the "erasing" of the memory cells of ROW 1 is complete, the reference pattern may then be stored in the row.

To now store the reference pattern in ROW 1 of the matrix 41′, the row switch $RS_1'$ in the row selection line $R_1$ is maintained closed by the row selection register 5′ and the row decoder 6′ in the manner previously described. The remaining row switches are kept in an open condition. The binary counter 50, after initial resetting by a COUNTER RESET signal from the timing and control unit, is caused to sequentially count in binary fashion by means of COUNTER STEPPING signals from the timing and control unit whereby a plurality of binary "one" and "zero" signals in various combinations are provided on the counter output lines $51_1 \ldots 51_4$. The decoder 52 decodes each combination of binary signals and applies current signals to the decoder output lines $52_1 \ldots 52_4$ in sequence.

Each of the gates $G_1 \ldots G_4$ is adapted to provide an output signal of a positive polarity on its associated drive conductor $D_1 \ldots D_4$ in response to receiving a signal on its associated decoder output line $52_1 \ldots 52_4$ together with a synchronized binary "one" signal on the reference input line 55. Thus, whenever a binary "one" is to be stored in a given memory cell M′, one of the gates $G_1 \ldots G_4$ corresponding to the cell M′ is actuated by a signal on a corresponding one of the decoder output lines $52_1 \ldots 52_4$ and a binary "one" signal is applied to the gate. The current on the drive conductor $D_1 \ldots D_4$ is alone of sufficient magnitude to establish an electromagnetic field of proper orientation which switches the "zero" state of magnetization of the corresponding memory cell M′ in the selected row to a "one" state of magnetization. In the above example, therefore, a binary "one" is stored in any one of the memory cells $M_{11}'$, $M_{12}'$, $M_{13}'$, or $M_{14}'$ of ROW 1 by the presence of a drive current on the associated one of the drive conductors $D_1 \ldots D_4$. Binary "ones" are stored in the remaining rows of the matrix 41′ in the same manner, that is, by closing the appropriate row switch $RS_1'$, and by appropriately providing currents on the drive conductors $D_1 \ldots D_4$.

CORRELATION—FIG. 4

The correlation of an unknown pattern, whether a binary pattern or a quantized analog pattern, takes place in the same manner as previously described in connection with FIG. 2, that is, by a bi-polar stress wave alone. However, in the magneto-sonic correlator 40′ of FIG. 4, the positive and negative polarity signals induced as a result of the coaction of the bi-polar stress pulses and the memory cells M′, are summed by the sense conductors $S_1 \ldots S_4$ (corresponding to the conducting strip 17, noting FIG. 3). Further discussion of the operation of the magneto-sonic correlator 40′ of FIG. 4 is believed unnecessary.

FABRICATION OF MAGNETO-SONIC MATRIX

The magneto-sonic matrices 41 and 41′ illustrated in FIGS. 2 and 4, respectively, may be fabricated from known materials and by employing conventional techniques. For example, in FIG. 2, the sound-conducting substrate 27 may be glass. The acoustic transducer 34 may be a piezoelectric ceramic transducer and may be of unitary construction or, alternatively, several transducers bonded end to end by a suitable adhesive. Alternatively, the acoustic transducer 34 may be formed by deposition. The sound absorbers 32 and 33 may be formed from copper loaded with lead. The memory cells M are typically thin anisotropic magnetic films formed by vacuum depositing a material composed substantially of 60% nickel and 40% iron. The sense-drive conductors $SD_1$ . . . $SD_4$ are typically formed of aluminum by known deposition processes. A deposited layer of silicon oxide may be used as an insulator. Although shown surrounding the memory cells M and the substrate 27, the sense-drive conductors SD may be disposed on the top surface of the substrate 27 adjacent each row of memory cells M. To increase the capacity of the correlator 40 shown in FIG. 2, memory cells M may be deposited on both sides of the substrate 27. Additionally, several magneto-sonic matrices such as shown at 41 in FIG. 2 may be arranged in a stacked relationship and suitable plane-selection and other associated electronics provided.

It will now be apparent that novel magneto-sonic correlators have been disclosed in such full, clear, concise and exact terms as to enable any person skilled in the art to which they pertain to make and use the same. It will also be apparent that various changes and modifications may be made in form and detail by those skilled in the art without departing from the spirit and scope of the invention.

What is claimed is:

1. Magneto-sonic correlator apparatus comprising:
magneto-sonic means including
(a) stress-wave conducting means adapted to conduct a stress wave;
(b) a plurality of magnetostrictive cells arranged on said stress-wave conducting means in a predetermined format;
(c) conductor means associated with said cells; and
(d) stress-wave generating means adapted to propagate a stress wave along said stress-wave conducting means;
recording means adapted to establish either a first state of magnetization or a second state of magnetization in each of said cells whereby information of a corresponding first type or a second type is recorded in each of said cells;
means adapted to provide signals representative of input information to said stress-wave generating means to cause said stress-wave generating means to propagate a stress wave representative of the input information along said stress-wave conducting means, said stress wave stressing each of said cells whereby the remanent flux of each of said cells is increased or decreased depending on the state of magnetization of each cell and the input information represented by said stress wave, thereby causing signals of a first type corresponding to increases in remanent flux or a second type corresponding to decreases in remanent flux to be induced in said conductor means; and
threshold circuit means establishing a predetermined threshold condition and adapted to receive said induced signals and to provide an output signal when the combination of the signals induced in said conductor means exceeds said predetermined threshold condition.

2. Magneto-sonic correlator apparatus in accordance with claim 1 wherein said recording means includes:
pulse generator means adapted to apply a signal to said stress-wave generating means whereby said stress-wave generating means is excited and a stress pulse is launched into and along said stress-wave conducting means; and
means adapted to successively apply pulses representative of information to be recorded in said magnetostrictive cells, each pulse having a first polarity or a second polarity, to said conductor means in synchronism with the arrival of said stress pulse at each of said magnetostrictive cells whereby each of said cells is stressed and electromagnetic fields of a corresponding first direction or second direction are established in each of said magnetostrictive cells by the pulses applied to said conductors means thereby causing a corresponding first state of magnetization or a second state of magnetization to be established in each of said magnetostrictive cells.

3. Magneto-sonic correlator apparatus in accordance with claim 1 wherein said recording means includes:
a plurality of drive conductor means associated with said magnetostrictive cells;
means adapted to apply signals of a first polarity to said drive conductor means to cause said second state of magnetization to be established in each of said magnetostrictive cells; and
means adapted to apply signals of a second polarity to selected ones of said plurality of drive conductor means to cause the state of magnetization of the magnetostrictive cells associated with said selected ones of said plurality of drive conductor means to be altered from said second state of magnetization to said first state of magnetization.

4. Magneto-sonic correlator apparatus comprising:
magneto-sonic means including
(a) stress-wave conducting means adapted to conduct a stress wave;
(b) a plurality of magnetostrictive cells arranged on said stress-wave conducting means in a predetermined format;
(c) conductor means associated with said cells; and
(d) stress-wave generating means adapted to propagate a stress wave along said stress-wave conducting means;
recording means adapted to establish either a first state of magnetization or a second state of magnetization in each of said cells whereby information of a corresponding first type or a second type is recorded in each of said cells;
means adapted to provide a plurality of signals representative of input information to said stress-wave generating means to cause a stress wave comprising a plurality of stress pulses which represent the input information to be propagated by said stress-wave generating means along said stress-wave conducting means, adjacent ones of said stress pulses being spaced apart by a distance equal to the spacing between adjacent magnetostrictive cells, each of said stress pulses stressing each of said cells whereby the remanent flux of each of said cells is increased or decreased depending on the state of magnetization of each cell and the information represented by each of said stress pulses thereby causing signals of a first type corresponding to increases in remanent flux or a second type corresponding to decreases in remanent flux to be induced in said conductor means; and
output means connected to said conductor means and adapted to provide an output signal at such time as each stress pulse arrives at the magnetostrictive cell corresponding thereto and the input information represented by said stress pulses corresponds to a desired degree with the information recorded in said magnetostrictive cells as indicated by said induced signals.

5. Magneto-sonic correlator apparatus comprising:
magneto-sonic means including
(a) stress-wave conducting means adapted to conduct a stress wave;
(b) a plurality of rows of magnetostrictive cells arranged on said stress-wave conducting means;
(c) a plurality of conductor means each associated with a row of magnetostrictive cells; and
(d) stress-wave generating means adapted to propagate a stress wave along said stress-wave conducting means;

recording means adapted to establish either a first state of magnetization or a second state of magnetization in each of said cells of each of said rows whereby information of a corresponding first type or a second type is recorded in each of said cells of each of said rows;

means adapted to provide a plurality of signals representative of input information to said stress-wave generating means to cause a stress wave comprising a plurality of stress pulses which represent the input information to be propagated by said stress-wave generating means along said stress-wave conducting means, adjacent ones of said stress pulses being spaced apart by a distance equal to the spacing between adjacent magnetostrictive cells of each row, each of said stress pulses stressing each of said cells of each of said rows whereby the remanent flux of each of said cells is increased or decreased depending on the state of magnetization of each cell and the information represented by each of said stress pulses, thereby causing signals of a first type corresponding to increases in remanent flux or a second type corresponding to decreases in remanent flux to be induced in said conductor means; and output means connected to said conductor means and adapted to provide an output signal at such time as each stress pulse arrives at the magnetostrictive cell of a row corresponding thereto and the input information represented by said stress pulses corresponds to a desired degree with the information recorded in said magnetostrictive cells of that row as indicated by said induced signals.

6. Magneto-sonic correlator apparatus in accordance with claim 5 wherein said output means includes:

a plurality of threshold circuits each coupled to a conductor means and establishing a predetermined threshold level, and each adapted to receive induced signals from the conductor means coupled thereto and to provide an output signal when the combination of signals induced in the conductor means exceeds said predetermined threshold level.

7. Magneto-sonic correlator apparatus in accordance with claim 5 wherein said recording means includes:

means for selecting a row of magnetostrictive cells in which information is to be recorded;

pulse generator means adapted to apply a signal to said stress-wave generating means whereby said stress-wave generating means is excited and a stress pulse is launched into and along said stress-wave conducting means; and means adapted to successively apply pulses representative of information to be recorded in said selected row of magnetostrictive cells, each pulse having a first polarity or a second polarity, to said conductor means in synchronism with the arrival of said stress pulse at each of said magnetostrictive cells of said selected row whereby each of said cells is stressed and electromagnetic fields of a corresponding first direction or second direction are established in each of said magneostrictive cells of said selected row by the pulses applied to said conductor means thereby causing a corresponding first state of magnetization or a second state of magnetization to be established in each of said magnetostrictive cells of said selected row.

8. Magneto-sonic correlator apparatus in accordance with claim 5 wherein said recording means includes:

a plurality of drive conductor means associated with the magnetostrictive cells of each row;

means for selecting one of said rows of magnetostrictive cells in which information is to be recorded;

means adapted to apply signals of a first polarity to said drive conductor means to cause said second state of magnetization to be established in each of the magnetostrictive cells of the selected row; and means adapted to apply signals of a second polarity to selected ones of said plurality of drive conductor means to cause the state of magnetization of the magnetostrictive cells of the row associated with said selected ones of said plurality of drive conductor means to be altered from said second state of magnetization to said first state of magnetization.

9. Magneto-sonic correlator apparatus comprising:

magneto-sonic means including
- (a) stress-wave conducting means adapted to conduct a stress wave;
- (b) a plurality of rows of magnetostrictive cells arranged on said stress-wave conducting means;
- (c) a plurality of conductor means each associated with a row of magnetostrictive cells; and
- (d) stress-wave generating means adapted to propagate a stress wave along said stress-wave conducting means;

recording means adapted to establish either a first state of magnetization or a second state of magnetization in each of said cells of each of said rows whereby information of a corresponding first type or a second type is recorded in each of said cells of each of said rows;

means adapted to provide a plurality of signals representative of input information to said stress-wave generating means to cause a stress wave comprising a plurality of bi-polar stress pulses which represent the input information to be propagated by said stress-wave generating means along said stress-wave conducting means, said stress pulses stressing each of said cells of each of said rows whereby the remanent flux of each of said cells is increased or decreased depending on the state of magnetization of each cell and the polarity of each of said stress pulses thereby causing signals of a first polarity corresponding to increases in remanent flux or a second polarity corresponding to decreases in remanent flux to be induced in said plurality of conductor means; and output means connected to said conductor means and adapted to provide an output signal at such time as each stress pulse arrives at the magnetostrictive cell of a row corresponding thereto and the input information represented by the polarities of said stress pulses corresponds to a desired degree with the information recorded in said magnetostrictive cells of that row as indicated by said induced signals.

10. Magneto-sonic correlator apparatus comprising:

magneto-sonic means including
- (a) stress-wave conducting means adapted to conduct a stress wave;
- (b) a plurality of rows of magnetostrictive cells arranged on said stress-wave conducting means;
- (c) a plurality of conductor means each associated with a row of magnetostrictive cells; and
- (d) stress-wave generating means adapted to propagate a stress wave along said stress-wave conducting means;

recording means adapted to establish either a first state of magnetization or a second state of magnetization in each of said cells of each of said rows whereby binary "one" information or binary "zero" information, respectively, is recorded in each of said cells of each of said rows;

means adapted successively to provide a plurality of signals representative of input information to said stress-wave generating means to cause a stress wave comprising a plurality of stress pulses of a first polarity or a second polarity representing binary "one" or binary "zero" information, respectively, to be propagated by said stress-wave generating means along said stress-wave conducting means, adjacent ones of said stress pulses being spaced apart by a distance equal to the spacing between adjacent magnetostrictive cells of each row, each of said stress pulses stressing each of said cells of each of said rows to cause a voltage signal of a first polarity to be induced in the conductor means associated therewith if the binary "one" or binary "zero" information recorded in the cell is the same as the binary "one" or binary "zero" information represented by the polarity of the stress pulse stressing the cell, and a voltage signal of a second polarity to be induced in the conductor means associated therewith if the binary "one" or binary "zero" information recorded in the cell is different from the binary "one" or binary "zero" information represented by the polarity of the stress pulse stressing the cell, said induced voltages of said first polarity and said second polarity being summed by said conductor means associated with said rows of cells each time each of said stress pulses stresses a cell; and output means connected to said conductor means and adapted to provide an output signal at such time as each stress pulse arrives at magnetostrictive cells of each of the rows corresponding thereto and the binary "one" and binary "zero" information represented by the polarities of said stress pulses corresponds to a desired degree with the binary "one" and binary "zero" information recorded in the magnetostrictive cells of one of said rows as indicated by the maximum value of the sum of the induced voltage signals on one of said conductor means.

References Cited

UNITED STATES PATENTS

| | | | |
|---|---|---|---|
| 3,411,149 | 11/1968 | Shahbender | 340—174 |
| 3,434,119 | 3/1969 | Onyshkevych | 340—173 |

BERNARD KONICK, Primary Examiner

KENNETH E. KROSIN, Assistant Examiner

U.S. Cl. X.R.

340—146.2, 173